United States Patent
Rodriguez et al.

(10) Patent No.: US 10,262,082 B2
(45) Date of Patent: Apr. 16, 2019

(54) INFLUENCE MAP GENERATOR MACHINE

(71) Applicant: Microsoft Technology Licensing, LLC, Redmond, WA (US)

(72) Inventors: Mario Sergio Rodriguez, Santa Clara, CA (US); Milad Alemzadeh, San Francisco, CA (US); Igor Perisic, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 14/751,862

(22) Filed: Jun. 26, 2015

(65) Prior Publication Data

US 2016/0378882 A1 Dec. 29, 2016

(51) Int. Cl.
G06F 17/30 (2006.01)
H04L 29/08 (2006.01)
G06Q 50/00 (2012.01)

(52) U.S. Cl.
CPC .. G06F 17/30994 (2013.01); G06F 17/30598 (2013.01); G06F 17/30958 (2013.01); G06Q 50/01 (2013.01); H04L 67/306 (2013.01)

(58) Field of Classification Search
CPC .................................................. G06F 17/30994
USPC ........................................................ 707/737
See application file for complete search history.

(56) References Cited

U.S. PATENT DOCUMENTS 6,192,346 B1 * 2/2001 Green ............ G06Q 10/063116
705/7.16
8,452,851 B2 * 5/2013 Kabiljo ............. G06F 17/30861
705/1.1
9,049,249 B2 6/2015 Zhang et al.
2010/0095343 A1 * 4/2010 Kaihotsu ............ H04N 7/17318
725/118

(Continued)

FOREIGN PATENT DOCUMENTS

WO WO 2014084829 A1 * 6/2014 ....... G06Q 10/06398

OTHER PUBLICATIONS

"Company Profile Directory | Business Information Database—LexisNexis", [Online]. Retrieved from the Internet: <URL: http://www.corporateaffiliations.com/, (Accessed Jul. 2, 2015), 1 pg.

(Continued)

*Primary Examiner* — Cam Linh T Nguyen
(74) *Attorney, Agent, or Firm* — Schwegman Lundberg & Woessner, P.A.

(57) ABSTRACT

A map generator machine generates influence maps based on profiles of entities, such as members of an online social networking service. The entities can be treated as nodes within a social graph, and each node may be represented by a corresponding node profile. The machine is configured to access a database of node profiles and rank the nodes according to seniority information contained in the node profiles. The machine is further configured to group nodes into clusters based on skill similarity based on skill descriptors included in their corresponding node profiles. The machine is also configured to generate one or more maps to depict one or more the subsets of the nodes. As generated, such a map is a graphical presentation of at least some of the nodes of the social graph, and the map may be generated with visual indicators of seniority and skill similarity.

17 Claims, 12 Drawing Sheets
(3 of 12 Drawing Sheet(s) Filed in Color)

(56) References Cited

U.S. PATENT DOCUMENTS

| | | | | |
|---|---|---|---|---|
| 2011/0258025 A1* | 10/2011 | Purvy | ............... | G06Q 30/02 705/14.16 |
| 2012/0095863 A1* | 4/2012 | Schiff | ............... | G06Q 30/0631 705/26.7 |
| 2013/0030851 A1* | 1/2013 | Rahmouni | ............ | G06Q 10/00 705/7.11 |
| 2013/0293551 A1* | 11/2013 | Erez | .................. | G06T 11/206 345/440 |
| 2014/0129631 A1* | 5/2014 | Jayaram | ............ | G06Q 50/01 709/204 |
| 2014/0344270 A1* | 11/2014 | Lambert | .......... | G06F 17/30867 707/737 |
| 2016/0292793 A1* | 10/2016 | Burstein | .......... | G06F 17/30905 |
| 2016/0321761 A1* | 11/2016 | Lytkin | .................. | G06Q 50/01 |

OTHER PUBLICATIONS

"CrunchBase The Business Graph", [Online]. Retrieved from the Internet: <URL: https://www.crunchbase.com/, (Accessed Jul. 2, 2015), 4 pgs.

"Hoovers™", [Online]. Retrieved from the Internet: <URL: http://www.hoovers.com/, (Accessed Jul. 2, 2015), 2 pgs.

"LinkedIn Corp (LNKD.K) People", [Online]. Retrieved from the Internet: <URL: http://www.reuters.com/finance/stocks/companyOfficers?symbol=LNKD.K&WTmodLOC=C4-Officers-5, (Accessed Jul. 2, 2015), 3 pgs.

"LinkedIn Organizational Chart", WikiOrgCharts, Inc., [Online]. Retrieved from the Internet: <URL: http://wikiorgcharts.com/company/linkedin/, (Accessed Jul. 2, 2015), 1 pg.

"List of companies based in Austin, Texas", Wikipedia, [Online]. Retrieved from the Internet: <URL:https://en.wikipedia.org/wiki/List_of_companies_based_in_Austin,_Texas, (Accessed Jul. 2, 2015), 10 pgs.

"Organization and Divisions of the RAND Corporation", [Online]. Retrieved from the Internet: <URL: http://www.rand.org/about/organization.html, (Accessed Jul. 2, 2015), 1 pg.

"Vault", [Online]. Retrieved from the Internet: <URL: http://www.vault.com/, (Accessed Jul. 2, 2015), 2 pgs.

"Visuwords™ Online Graphical Dictionary", [Online]. Retrieved from the Internet: <URL: http://www.visuwords.com/, (Accessed Jul. 2, 2015), 4 pgs.

"Xerox Leadership: 2013 Annual Report", [Online]. Retrieved from the Internet: <URL: http://www.xerox.com/annualreport/2013/xerox-leadership.html, (Accessed Jul. 2, 2015), 2 pgs.

* cited by examiner

US 10,262,082 B2

INFLUENCE MAP GENERATOR MACHINE

TECHNICAL FIELD

The subject matter disclosed herein generally relates to machines that are configured to generate, present, or otherwise process data. Specifically, the present disclosure addresses systems and methods to facilitate generation of maps.

BACKGROUND

When a user of an online social networking service registers to become a member of the online social networking service, the user typically provides at least some personal (e.g., biographical) information. Such personal information may include the person's full name, a picture (e.g., photograph) of the person, information about the person's current employment status (e.g., name of employer, industry of employer, current job title, and skills), information about the person's formal education (e.g., schools attended and degrees earned), and information about the person's interests generally. All of this information may be aggregated and stored in a profile (e.g., member profile). Typically, each member of the online social networking service has his or her own member profile.

As a member uses the online social networking service over time, the member may add information to his or her member profile. For example, the member may periodically update his or her profile to reflect his or her current employment status as the member leaves one employment position and takes on another. As the member unilaterally or bilaterally connects with (e.g., "follows" or "friends") other members (e.g., users, organizations, such as companies or schools, or other entities) represented in the online social networking service, these associations (e.g., relationships) may be added to the member's profile. The member may also add skills to his or her member profile (e.g., to highlight his or her special talents and expertise).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitation in the figures of the accompanying drawings.

DETAILED DESCRIPTION

Figure 1:
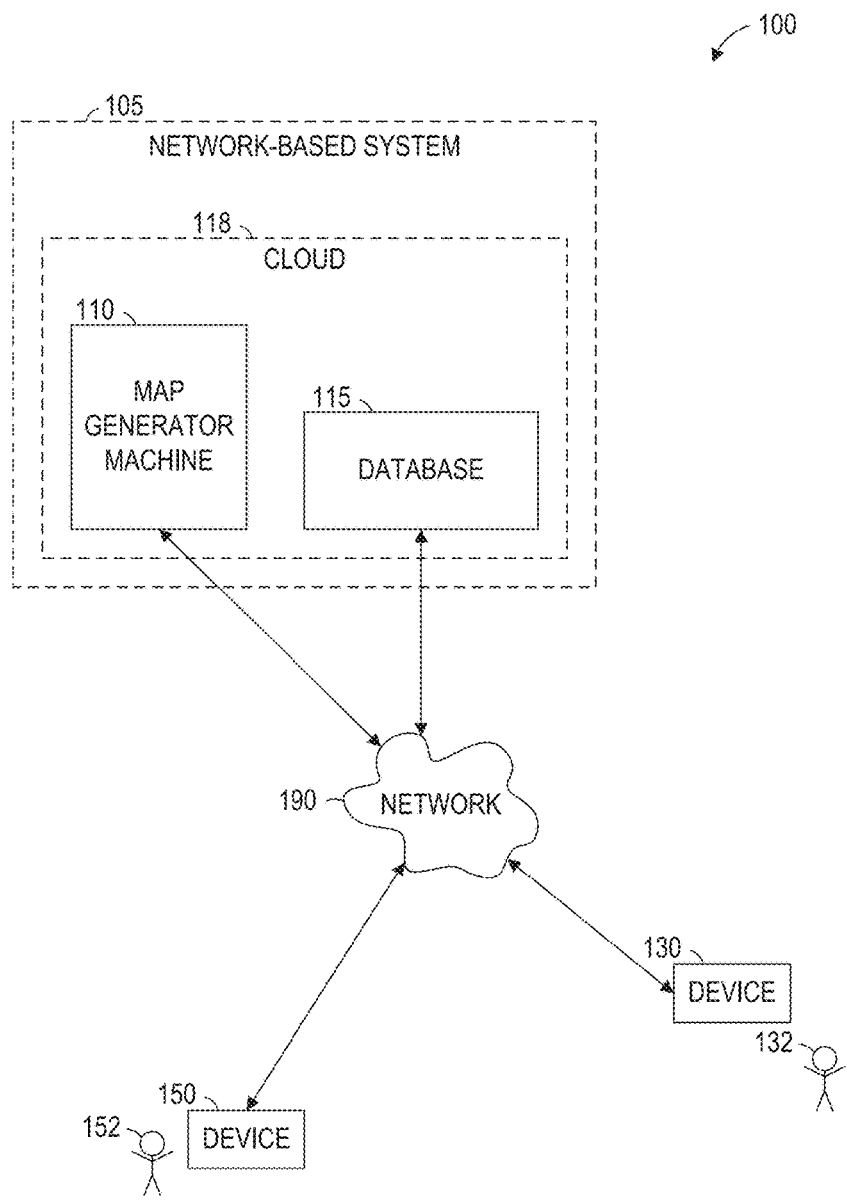
FIG. 1 is a network diagram illustrating a network environment suitable for operating a map generator machine (e.g., an influence map generator machine), according to some example embodiments.

Example methods and systems (e.g., machines) are configured to facilitate generation of maps (e.g., influence maps). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a map generator machine) may be configured (e.g., by one or more software modules) to generate one or more influence maps based on profiles of entities (e.g., members of an online social networking service). Such a machine may form all or part of a cloud-based social networking system (e.g., a system of multiple server machines networked together and configured to provide one or more social networking services). The entities, their profiles, or both, may be treated as nodes within a social graph (e.g., a data structure that specifies social relationships between and among the nodes), and each node may be defined by, described by, or otherwise represented by its corresponding profile, which may be called a node profile.

As configured, the machine includes a profile module configured to access a database of node profiles (e.g., a social graph database in which the profiles are stored). The machine also includes a rank module configured to rank the nodes based on (e.g., according to) seniority (e.g., as indicated within the corresponding node profiles by seniority information, such as experience data). The machine further includes a skill module configured to group, cluster, or otherwise associate nodes into subsets (e.g., groups or clusters) based on skill similarity (e.g., based on skill descriptors in the corresponding node profiles). Furthermore, the machine includes a map module configured to generate one or more maps to graphically depict one or more of the subsets of the nodes. As used herein, such a generated map is a graphical presentation of at least some of the nodes of the social graph (e.g., a subset of the nodes). According to various example embodiments, the map module generates the map with visual indicators of seniority and skill similarity. Such a map may be called an influence map (e.g., a map of influence relations between and among the entities represented by the nodes of the social graph).

In example embodiments that operate within the context of an online social networking service, the machine is therefore configured to rank a group of members by seniority and then cluster the ranked members by similarities in skills. This enables the machine to determine (e.g., predict, infer, or both) various influence relationships among the group of members and generate an influence map that depicts these influence relationships. For example, the group of members may all be members of an online social networking service, and the machine may be configured to generate a map that shows sub-groups, such as families, households, or cliques, as well as who is the most likely leader of each sub-group. As another example, the group of members may all be employees of a company, and the machine may be configured to generate a map that shows which departments correspond to which clusters, as well as who is the most likely manager of each cluster. As a further example, the entities represented by the nodes may be available jobs (e.g., job postings) within a company or industry, and the machine may be configured to generate a map that indicates which jobs are likely to be performed together, as well as which job within each cluster is most likely to dominate that cluster. Moreover, this analysis can be performed without using job titles (e.g., manager, director, or vice president) from member profiles.

FIG. 1 is a network diagram illustrating a network environment 100 suitable for operating a map generator machine 110 (e.g., an influence map generator machine), according to some example embodiments. The network environment 100 includes a map generator machine 110, a database 115, and devices 130 and 150, all communicatively coupled to each other via a network 190. The map generator machine 110 may form all or part of a cloud 118 (e.g., a geographically distributed set of multiple machines configured to function as a single server), which may form all or part of a network-based system 105 (e.g., a cloud-based server system configured to provide one or more services, such as social networking services, to the devices 130 and 150). The map generator machine 110 and the devices 130 and 150 may each be implemented in a computer system, in whole or in part, as described below with respect to FIG. 12.

Also shown in FIG. 1 are users 132 and 152, either or both of which may be entities that are members of an online social networking service fully or partially maintained or otherwise provided by the network-based system 105. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., between the map generator machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
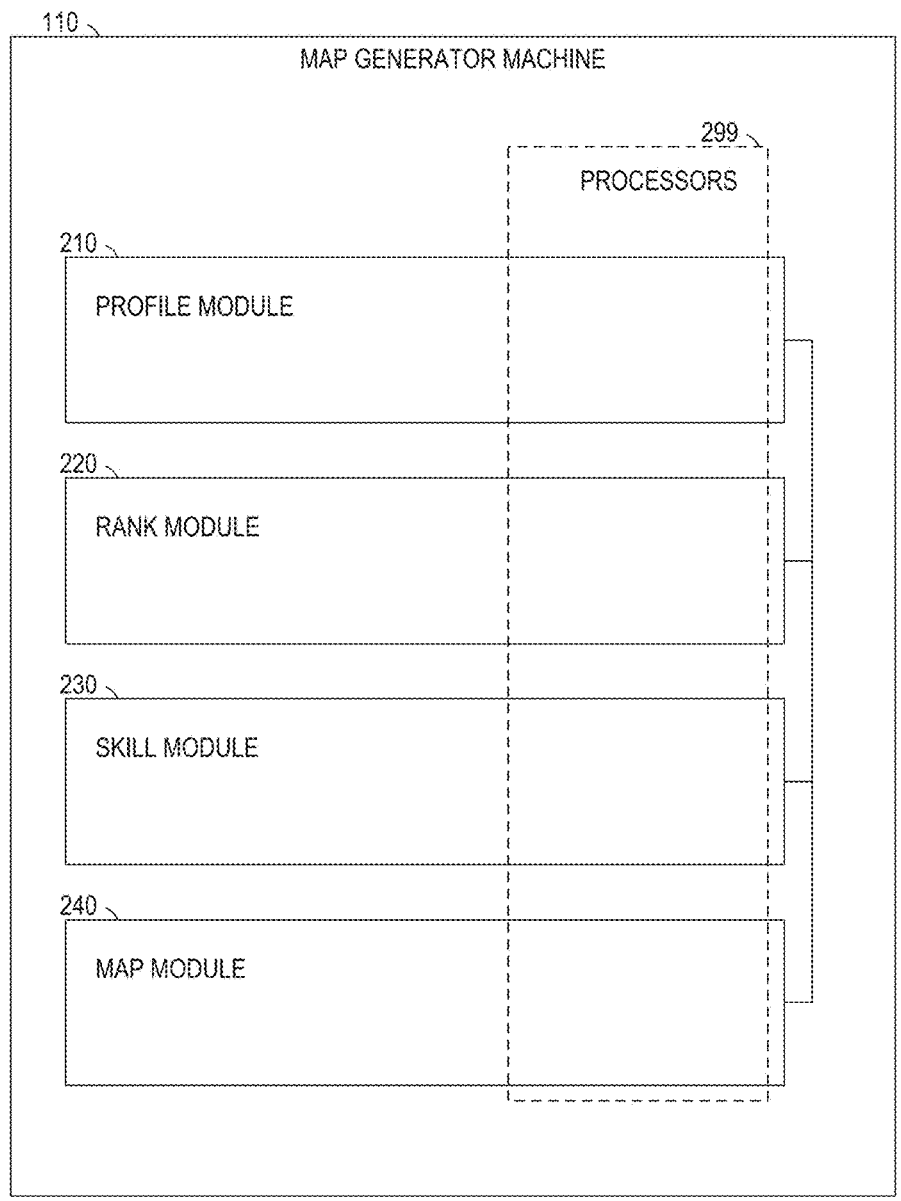
FIG. 2 is a block diagram illustrating components of a map generator machine suitable for generating one or more influence maps, according to some example embodiments.

FIG. 2 is a block diagram illustrating components of the map generator machine 110, according to some example embodiments. The map generator machine 110 is shown as including a profile module 210, a rank module 220, a skill module 230, and a map module 240, all configured to communicate with each other (e.g., via a bus, shared memory, or a switch). Furthermore, one or more processors 299 (e.g., hardware processors, digital processors, or any suitable combination thereof) may be included (e.g., temporarily or permanently) in the profile module 210, the rank module 220, the skill module 230, and the map module 240, or any suitable combination thereof.

The profile module 210 is configured to access the database 115 to retrieve, obtain, read, or otherwise access profiles (e.g., member profiles or other node profiles) stored by the database 115. The access profiles represent nodes within a social graph (e.g., used by the network-based system 105 in providing one or more social networking services).

The rank module 220 is configured to rank the nodes of the social graph based on (e.g., by) seniority. For example, the rank module 220 may access experience data from the node profiles and rank the corresponding nodes according to the accessed experience data.

The skill module 230 is configured to associate (e.g., group or cluster) the nodes of the social graph into subsets (e.g., clusters) based on skill similarity (e.g., based on degrees to which node profiles contain similar skill descriptors). For example, the skill module 230 may rank (e.g., sort, order, or sequence) the node profiles or identifiers thereof (e.g., node identifiers) based on vector distances that indicate degrees to which skill descriptors contained in the node profiles are similar to each other. Furthermore, the skill module 230 may be configured to calculate these vector distances (e.g., prior to grouping, clustering, or otherwise associating the nodes into subsets).

The map module 240 is configured to generate one or more maps (e.g., interactive or non-interactive influence maps) that graphically depict or otherwise present one or more of the subsets of nodes (e.g., as grouped by the skill module 230). According to various example embodiments, the map may be generated with one or more visual indicators of seniority, skill similarity, or any suitable combination thereof. Thus, in certain situations, the map module 230 can output an influence map that visually depicts influence relations between and among entities (e.g., members of the online social networking service) represented by the nodes of the social graph.

Any one or more of the modules described herein may be implemented using hardware alone (e.g., one or more of the processors 299) or a combination of hardware and software. For example, any module described herein may physically include an arrangement of one or more of the processors 299 (e.g., a subset of or among the processors 299) configured to perform the operations described herein for that module. As another example, any module described herein may include software, hardware, or both, that configure an arrangement of one or more of the processors 299 to perform the operations described herein for that module. Accordingly, different modules described herein may include and configure different arrangements of the processors 299 at different points in time or a single arrangement of the processors 299 at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
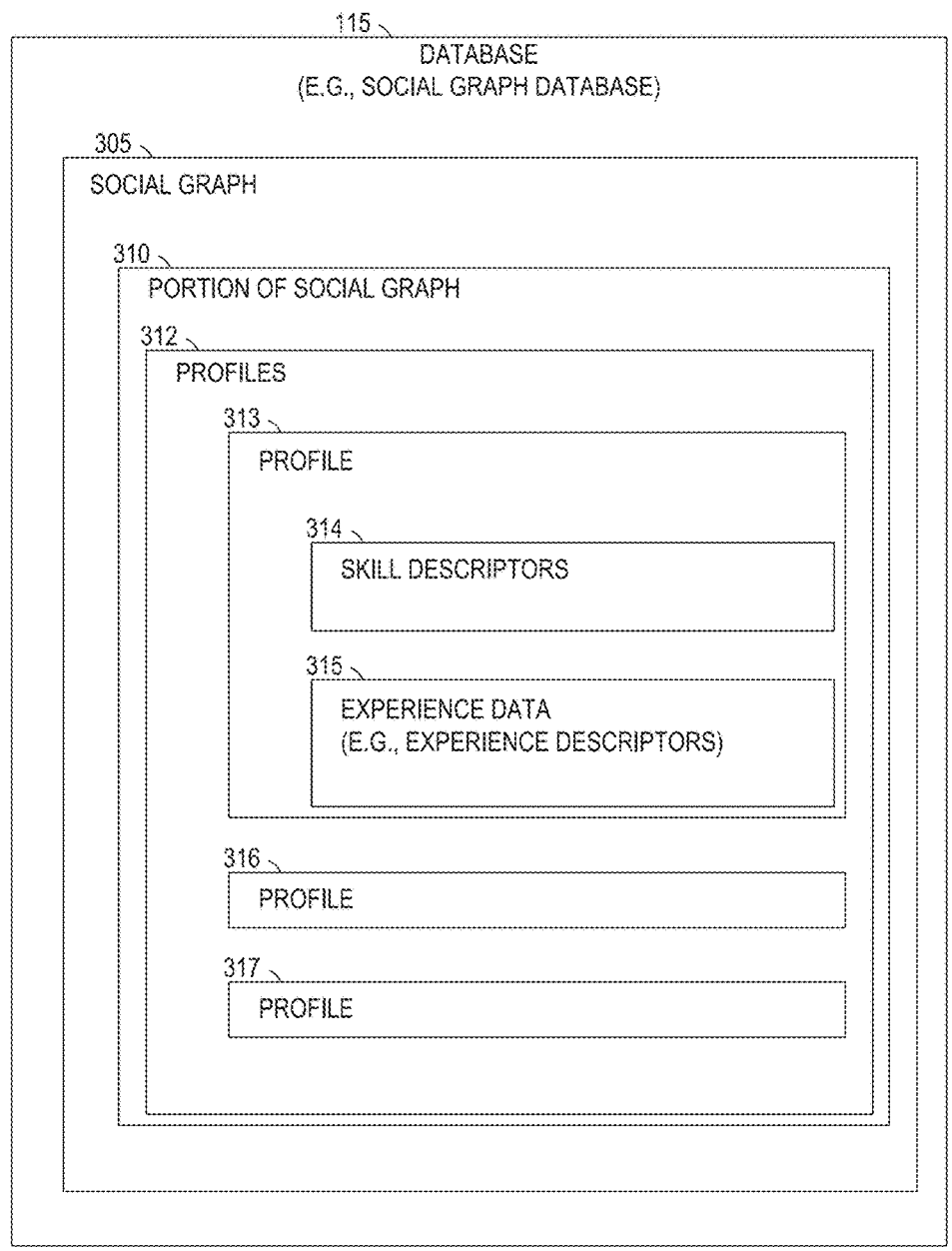
FIG. 3 is a block diagram illustrating components of a database suitable for supporting generation of one or more influence maps, according to some example embodiments.

FIG. 3 is a block diagram illustrating components of the database 115, according to some example embodiments. As shown, the database 115 may be a social graph database that stores a social graph 305 (e.g., among multiple social graphs). The social graph 305 is a data structure that defines, describes, specifies, identifies, indicates, or otherwise represents one or more types of social relationships between or among entities (e.g., members of an online social networking service, employees of a company, members of a club, members of a church, residents of a neighborhood, residents of a city, available jobs within a company, available jobs within an industry, available jobs within a geographic region, or any suitable combination thereof). Within the social graph 305, the entities are represented by nodes. As shown in FIG. 3, the social graph 305 may include a large quantity of nodes, and a portion of the nodes may be contained within a portion 310 of the social graph 305. In some example embodiments, as shown in FIG. 3, profiles 312 that describe the entities are used as the nodes. In alternative example embodiments, references to the profiles 312 (e.g., pointers, links, or identifiers) are used as the nodes.

The profiles 312 may be numerous. For clarity, FIG. 3 depicts just three profiles 313, 316, and 317. The profile 313 includes a set of one or more skill descriptors 314 (e.g., phrases, codes, or other strings that describe, specify, or otherwise indicate one or more skills or levels of proficiency therein for the corresponding node) and a set of experience data 315 (e.g., experience descriptors that fully or partially describe, specify, or otherwise indicate one or more levels of seniority for the corresponding node). In a similar manner, each of the other profiles 316 and 317 may contain skill descriptors, experience data, or both. Likewise, one or more additional profiles within the profiles 312 may also include skill descriptors, experience data, or both.

Figure 4:
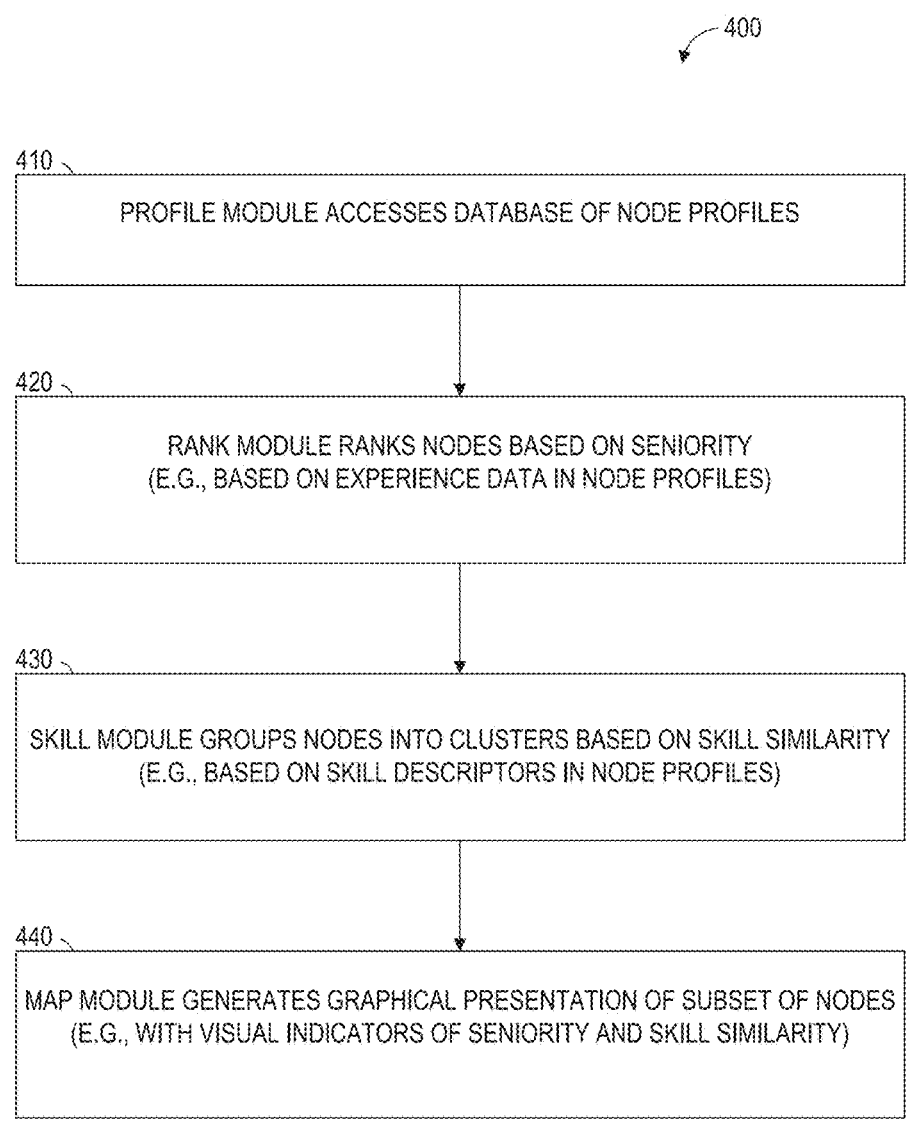
FIGS. 4-8 are flowcharts illustrating operations of the map generator machine in performing a method of generating a map such as an influence map, according to some example embodiments.

FIGS. 4-8 are flowcharts illustrating operations of the map generator machine 110 in performing a method 400 of generating a map (e.g., an influence map), according to some example embodiments. Operations in the method 400 may be performed by the map generator machine 110, using modules described above with respect to FIG. 2. As shown in FIG. 4, the method 400 includes at least operations 410, 420, 430, and 440.

In operation 410, the profile module 210 accesses the database 115 and thereby accesses the profiles 312 stored by the database 115. The accessed profiles 312 describe nodes of the social graph 305 or the portion 310 thereof. As noted above, each profile (e.g., profiles 313, 316, and 317) among the profiles 312 corresponds to a different node. Furthermore, each profile (e.g., profile 313) may include skill descriptors (e.g., skill descriptors 314) of its corresponding node, experience data (e.g., experience data 315) of its corresponding node, or both.

In operation 420, the rank module 220 ranks (e.g., sorts, orders, or sequences) the nodes based on (e.g., by or according to) seniority. This may be performed based on the collective (e.g., aggregated) experience data (e.g., experience data 315) included in the profiles 312 that were accessed in operation 410. The ranking of the nodes may be performed by ranking the profiles 312, ranking references (e.g., node identifiers or profile identifiers) that correspond to the profiles 312, or any suitable combination thereof. For example, the nodes may be ranked based on experience data that indicates numbers of years of experience, as indicated in the respective profiles for the nodes. As another example, the rank module 220 may compute seniority scores (e.g., numerical values that indicate levels of seniority) for the nodes algorithmically (e.g., based on experience data included in their respective profiles) and rank the nodes according to the computed seniority scores. In some example embodiments, computation of a seniority score forms all or part of calculating a professional reputation score (e.g., numerical values that indicates the extent to which a professional reputation is positive or negative).

In operation 430, the skill module 230 groups or otherwise associates the nodes of the social graph 305 or the portion 310 thereof. The nodes may be grouped into one or more subsets (e.g., clusters) based on (e.g., by or according to) degrees of similarity in skills. This grouping may be performed based on the collective (e.g., aggregated) skill descriptors (e.g., skill descriptors 314) included in the profiles that were accessed in operation 410. The grouping of the nodes may be performed by grouping the profiles 312, grouping references (e.g., node identifiers or profile identifiers) that correspond to the profiles 312, or any suitable combination thereof.

Figure 9:
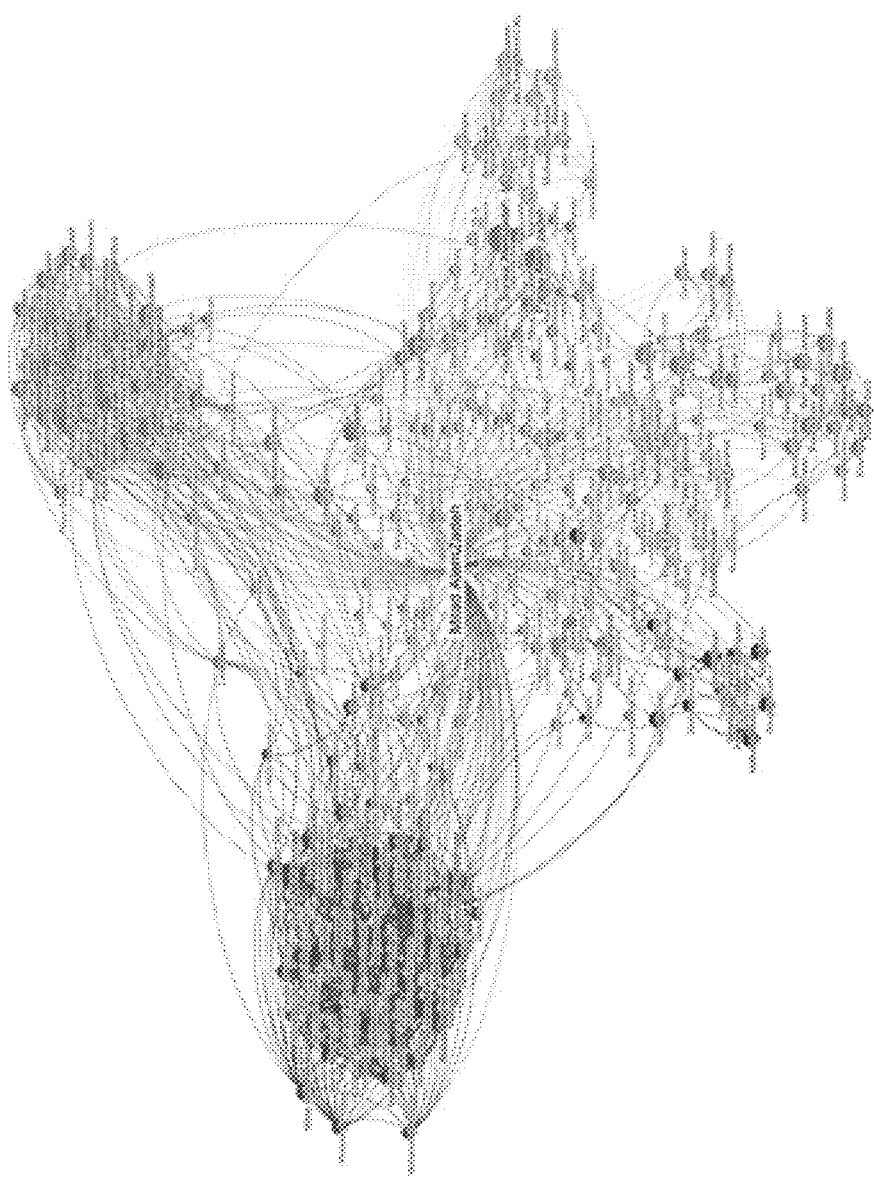
FIGS. 9-11 are screenshots depicting generated influence maps, according to some example embodiments.
Figure 10:
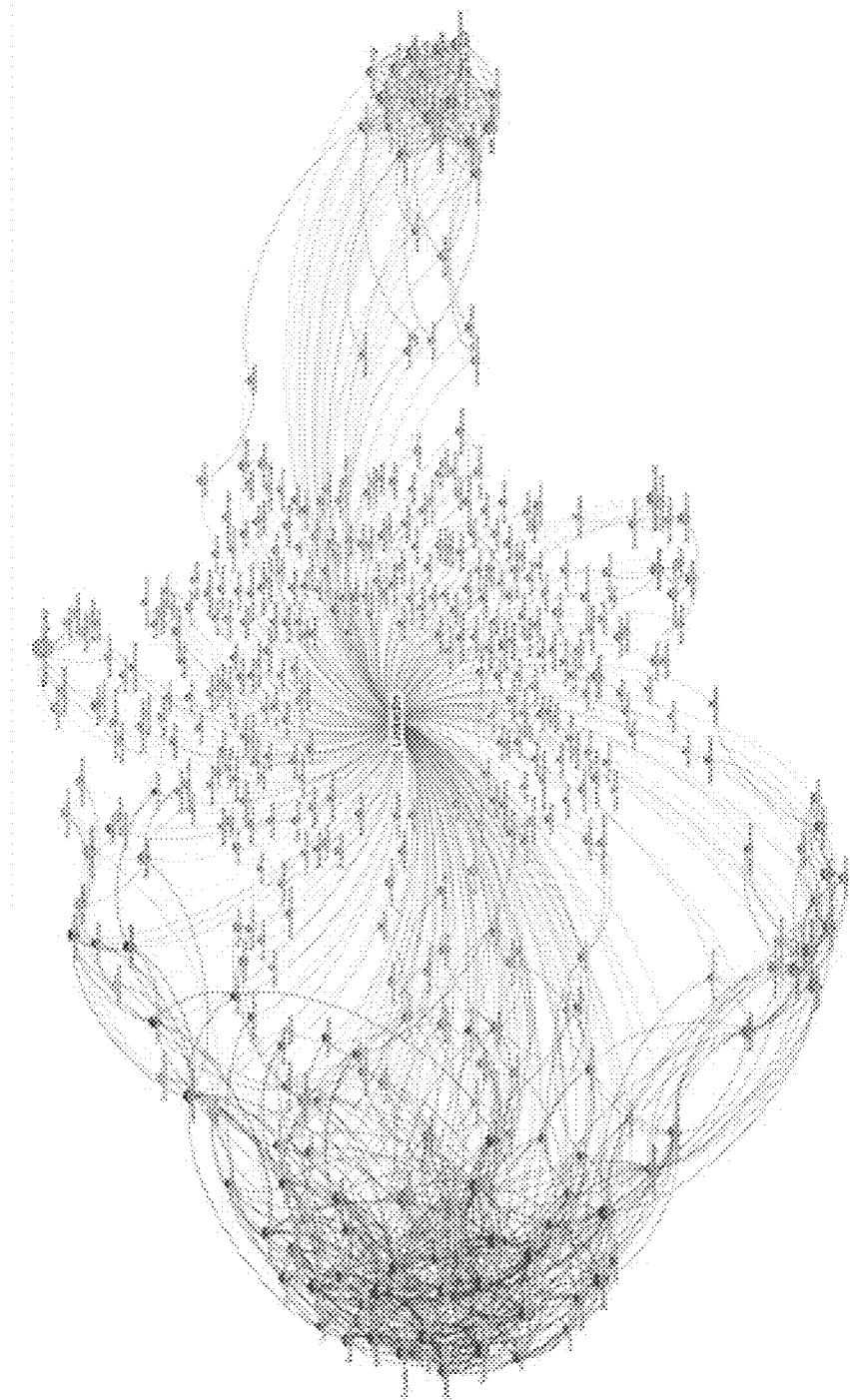
Figure 11:
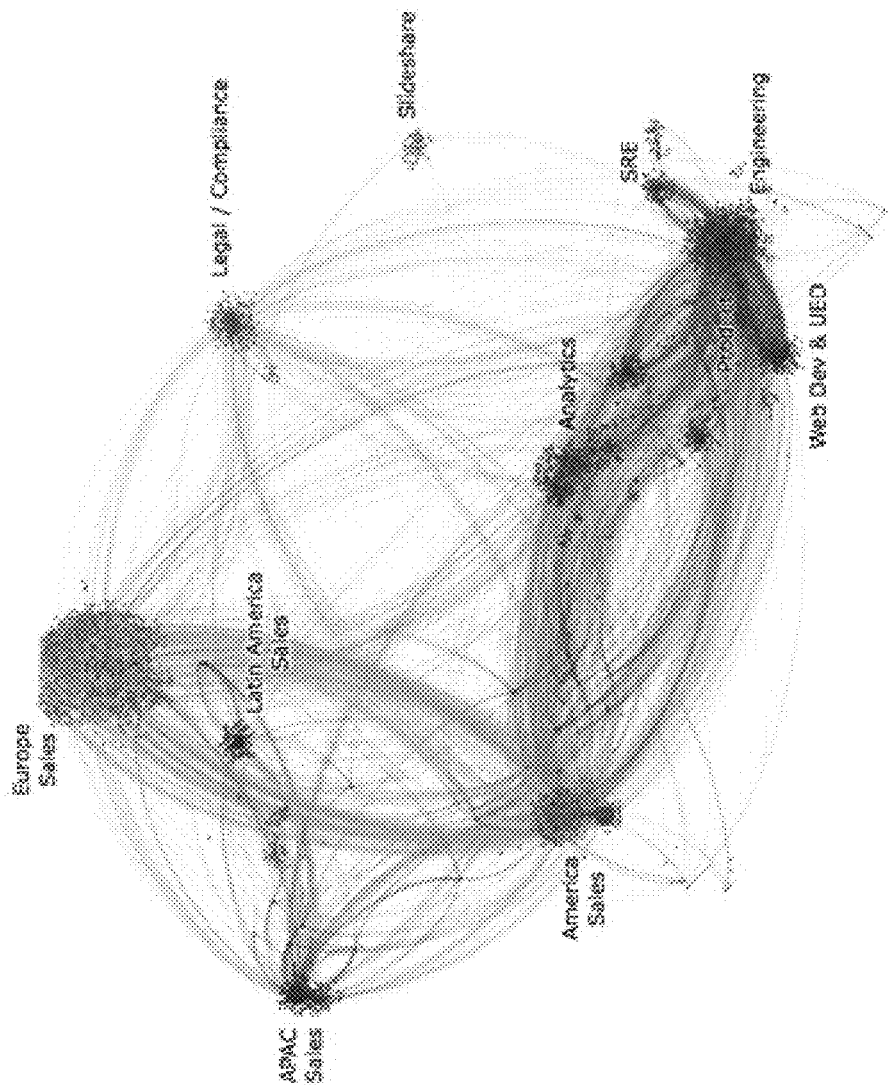

In operation 440, the map module 240 generates a graphical presentation of one or more of the grouped subsets of nodes that resulted from performance of operation 430. Examples of such a graphical presentation are shown in FIGS. 9-11. According to various example embodiments, the generated graphical presentation displays one or more of the subsets with visual indicators (e.g., first visual indicators) of seniority, visual indicators (e.g., second visual indicators) of degrees of similarity in skills, or any suitable combination thereof.

Figure 5:
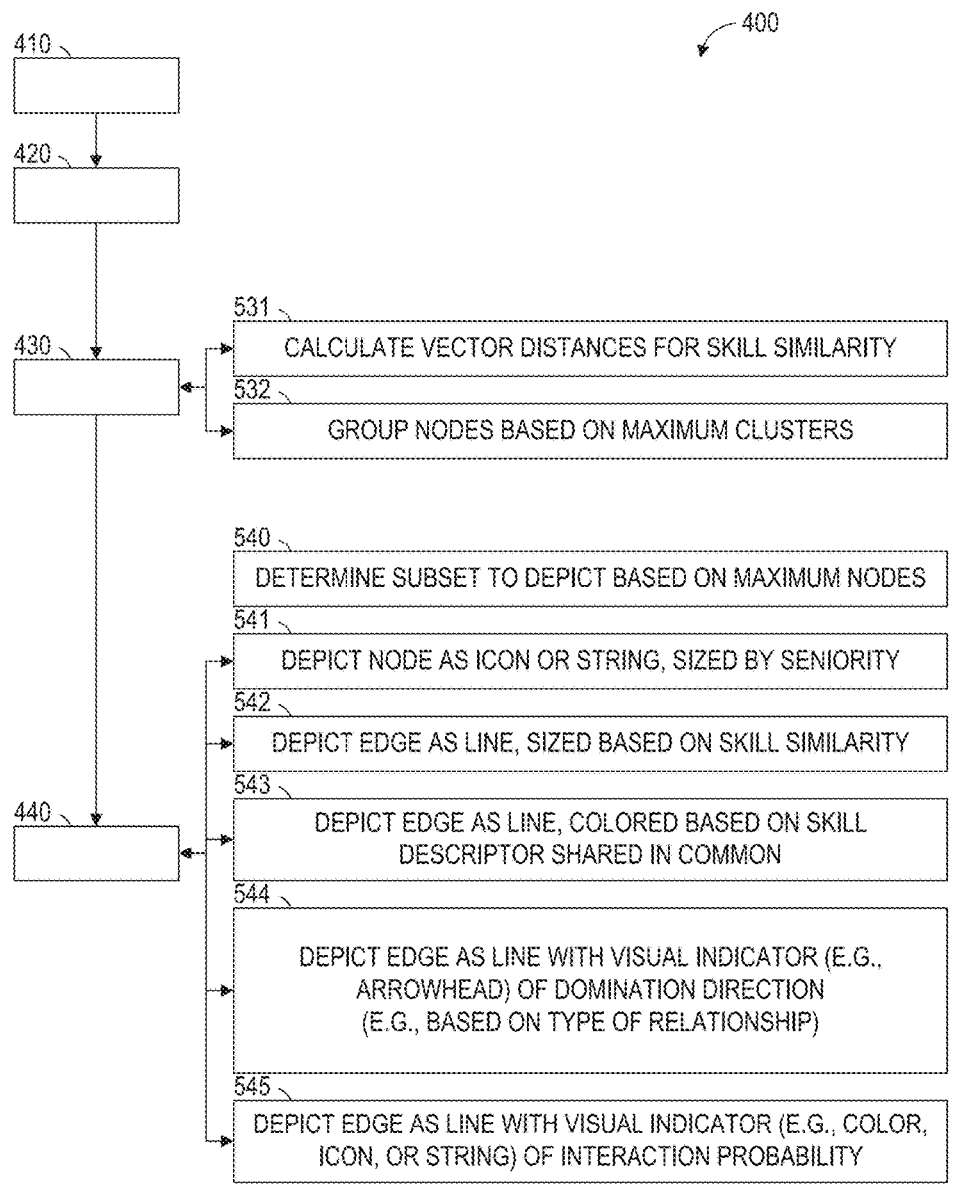

As shown in FIG. 5, the method 400 may include one or more of operations 531, 532, 540, 541, 542, 543, 544, and 545. One or more of operations 531 and 532 may be performed as part (e.g., a precursor task, a subroutine, or a portion) of operation 430, in which the skill module 230 groups or otherwise associates the nodes of the social graph 305, or the portion 310 thereof, into subsets of nodes (e.g., clusters of nodes).

In operation 531, the skill module 230 calculates vector distances that represent similarity in skill (e.g., degrees or extents to which skill descriptors are similar) between pairs of nodes within the social graph 305 or the portion 310 thereof. These vector distances may be calculated based on the skill descriptors of the corresponding pair of nodes. In some example embodiments, for each pair of nodes in the social graph 305 or in the portion 310, the skill module 230 calculates a corresponding vector distance that represents a degree or extent to which the skill descriptors (e.g., skill descriptors 314) in one node's profile (e.g., profile 313) are similar to the skill descriptors in the other node's profile. According to various example embodiments, calculation of the corresponding vector distance may be performed by calculating Jaccard similarity (e.g., based on presence or absence of skill descriptors), calculating cosine distance (e.g., based on skill descriptors), or both. Furthermore, according to various example embodiments, the operation 531 may be performed based on one or more skill endorsements (e.g., indicators that a skill descriptor has been endorsed by one or more third parties), reputation scores (e.g., indicators of extents to which an entity represented by a node has a positive or negative reputation), or any suitable combination thereof.

In operation 532, the skill module 230 groups or otherwise associates nodes within the social graph 305, or the portion 310 thereof, based on a maximum number of subsets (e.g., a predetermined or preconfigured maximum number of clusters) to be included in the graphical representation that will later be generated (e.g., in operation 440). In some example embodiments, the maximum number of subsets is preconfigured (e.g., hardcoded) as part of the skill module 230. In other example embodiments, the maximum number of subsets is determined based on input submitted by a user (e.g., user 132, who may be an entity represented by the profile 313). For example, the maximum number of subsets may be received as a user submission via the network 190 and via a graphical user interface (GUI) (e.g., a pulldown menu) presented by the device 130 of the user 132. As another example, the maximum number of subsets may be determined based on one or more user preferences (e.g., stored in the profile 313 or in a separate preference profile by the database 115), one or more historical user behaviors (e.g., logged by the database 115), or any suitable combination thereof. In some example embodiments, a hierarchical clustering of nodes is performed as all or part of operation 532.

According to certain example embodiments, the skill module 230 automatically labels the subsets (e.g., clusters) by choosing labels based on one or more of the most common (e.g., the most common one, the top ten, or the top five) skill descriptors in the profiles of the nodes in each subset. For example, the most common skill descriptor (e.g., among the skill descriptors 314) may be selected as a label to be automatically applied to a particular subset of nodes. In various example embodiments, the skill module 230 determines a label of a subset by accessing a database (e.g., a taxonomic database within the database 115) that relates skill descriptors with corresponding functional areas (e.g., occupational functional areas, such as corporate divisions, departments, or teams) and corresponding job titles. Thus, the skill module 230 may automatically label a subset with a most likely title, and most likely functional area, or both. This labeling may be based on most common (e.g., the most common one, the top ten, or the top five) skill descriptors in the profiles of the nodes in each subset.

One or more of operations 540, 541, 542, 543, 544, and 545 may be performed as part of operation 440, in which the map module 240 generates the graphical presentation of one or more subsets of nodes. In operation 540, the map module 240 determines (e.g., specifies, identifies, or selects) at least one subset to be depicted in the graphical presentation, and this determination may be based on a maximum number of nodes to be included in any presented subset in the graphical presentation. In some example embodiments, the maximum number of nodes is preconfigured (e.g., hardcoded) as part of the map module 240. In other example embodiments, the maximum number of nodes may be received as a user submission via the network 190 and by a GUI presented by the device 130 of the user 132. As another example, the maximum number of nodes may be determined based on one or more user preferences (e.g., stored in the profile 313 or in a separate preference profile by the database 115), one or more historical user behaviors (e.g., logged by the database 115), or any suitable combination thereof.

In operation 541, as part of generating the graphical presentation, the map module 240 incorporates a node among the at least one subset of nodes into the graphical presentation, and the incorporated node may be depicted as an icon, a text string, or any suitable combination thereof. Moreover, the icon or text string may be generated with a size (e.g., in terms of pixel height, pixel width, or both) that indicates the seniority of the node (e.g., a level of the absolute seniority or relative seniority in comparison to other nodes depicted or to be depicted in the graphical presentation).

In operation 542, as part of generating the graphical presentation, the map module 240 depicts a relationship between two nodes among the at least one subset of nodes. The relationship is treated as an edge between the two nodes and may be depicted as a line (e.g., one or more line segments, curved or straight) whose thickness indicates similarity in skill between the two nodes. For example, the thickness of the line may be determined (e.g., chosen or selected) by the map module 240 based on the corresponding vector distance calculated in operation 531. As noted above, such a vector distance represents a degree or extent to which the skill descriptors (e.g., skill descriptors 314) in one node's profile (e.g., profile 313) are similar to the skill descriptors in the other node's profile.

In operation 543, as part of generating the graphical presentation, the map module 240 depicts a relationship (e.g., an edge) between two nodes as a line whose color indicates similarity in skill between the two nodes. For example, the color of the line may be determined by the map module 240 based on the corresponding vector distance calculated in operation 531. As noted above, such a vector distance may be calculated based on the skill descriptors of the corresponding pair of nodes. For example, the color of the line may be determined by a quantity (e.g., 0, 1, 2, 5, 10, or 50) of skill descriptors (e.g., one or more of the skill descriptors 314) that are shared in common by the profiles (e.g., profiles 313 and 316) of the corresponding pair of nodes.

In operation 544, as part of generating the graphical presentation, the map module 240 depicts a relationship (e.g., an edge) between two nodes as a line with (e.g., adjacent to, proximate to, or otherwise visually accompanied by) a visual indicator (e.g., a third visual indicator) that indicates a direction of domination between the two nodes. For example, the visual indicator may be or include an arrowhead or other directional symbol. In performing operation 544, the map module 240 may determine the direction of domination based on one or more types of relationship between the two nodes (e.g., indicated in the corresponding profiles for the two nodes). Examples of such relationship types include a supervisory relationship (e.g., manager to employee), a seniority relationship (e.g., mentor to mentee, or veteran to new hire), a parental relationship (e.g., parent to child), an instructional relationship (e.g., teacher to student), or any suitable combination thereof.

In operation 545, as part of generating the graphical presentation, the map module 240 depicts a relationship (e.g., an edge) between two nodes as a line with a visual indicator (e.g., a third or fourth visual indicator) that indicates a probability of interaction between entities represented by the two nodes. For example, the visual indicator may be or include a color of the line, an icon (e.g., presented with the line), text string (e.g., presented with the line), or any suitable combination thereof. The visual indicator may be determined (e.g., chosen or selected) by the map module 240 based on the corresponding vector distance calculated operation 531, as well as one or more additional analytical operations.

Figure 6:
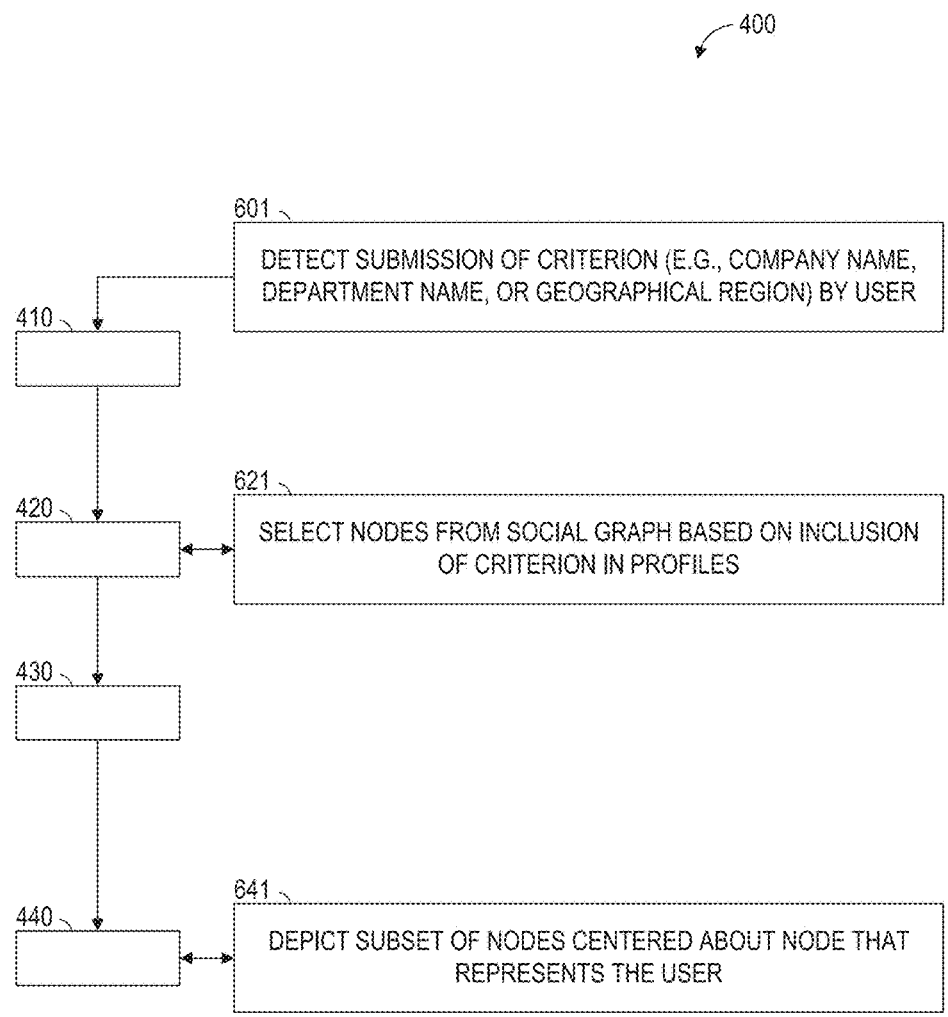

In certain example embodiments, one or more criteria can be used to identify (e.g., isolate) the portion 310 of the social graph 305 for better depiction of the nodes within the portion 310. In such situations, the portion 310 may be treated as a first social graph, such that the first social graph is a subset of a second social graph, namely, the social graph 305. Accordingly, as shown in FIG. 6, the method 400 may include one or more of operations 601, 621, and 641.

Operation 601 may be performed at any point prior to operation 430. In operation 601, the map generator machine 110 (e.g., by operation of the profile module 210 or the map module 240) detects submission of a criterion by the user 132 by the device 130. The user 132 (e.g., a member of an online social networking service) is represented by a node within the portion 310 of the social graph 305. In some example embodiments, the submitted criterion may be or include a company name (e.g., Bob's Fishing Trips, Apple®, or Google), a department name (e.g., Engineering, Finance, or Human Resources), or a geographic region (e.g., a city, a neighborhood, a county, a state, or a country).

Operation 621 may be performed as part (a precursor task, a subroutine, or a portion) of operation 420, in which the rank module 220 ranks the nodes whose profiles 312 were accessed in operation 410. In operation 420, the rank module 220 determines (e.g., chooses or selects) which nodes from the social graph 305 are included or to be included in the portion 310 of the social graph 305. In other words, the rank module 220 determines the content and boundaries of the portion 310 of the social graph 305 by determining which nodes are encompassed by the portion 310. Accordingly, operation 621 results in the selection of nodes of a first social graph (e.g., portion 310) from nodes of a second social graph (e.g., social graph 305'. Moreover, operation 621 may be performed based on the criterion whose submission was detected in operation 601. For example, the rank module 220 may determine that the criterion shared in common among the profiles that describe the nodes contained in the portion 310 (e.g., such that the shared criterion is included in each of the profiles that describe the nodes of the portion 310).

Operation 641 may be performed as part of operation 440, in which the map module 240 generates the graphical presentation of one or more of the grouped subsets of nodes. In operation 641, as part of generating the graphical presentation, the map module 240 depicts at least one of the grouped subsets of nodes as being centered about a particular node (e.g., first node or query node) that represents the user 132 who submitted the criterion detected in operation 601. Accordingly, the generated presentation (e.g., influence map) may visually appear to illustrate social relationships (e.g., influence relationships) centered around or otherwise focused on the user 132.

Figure 7:
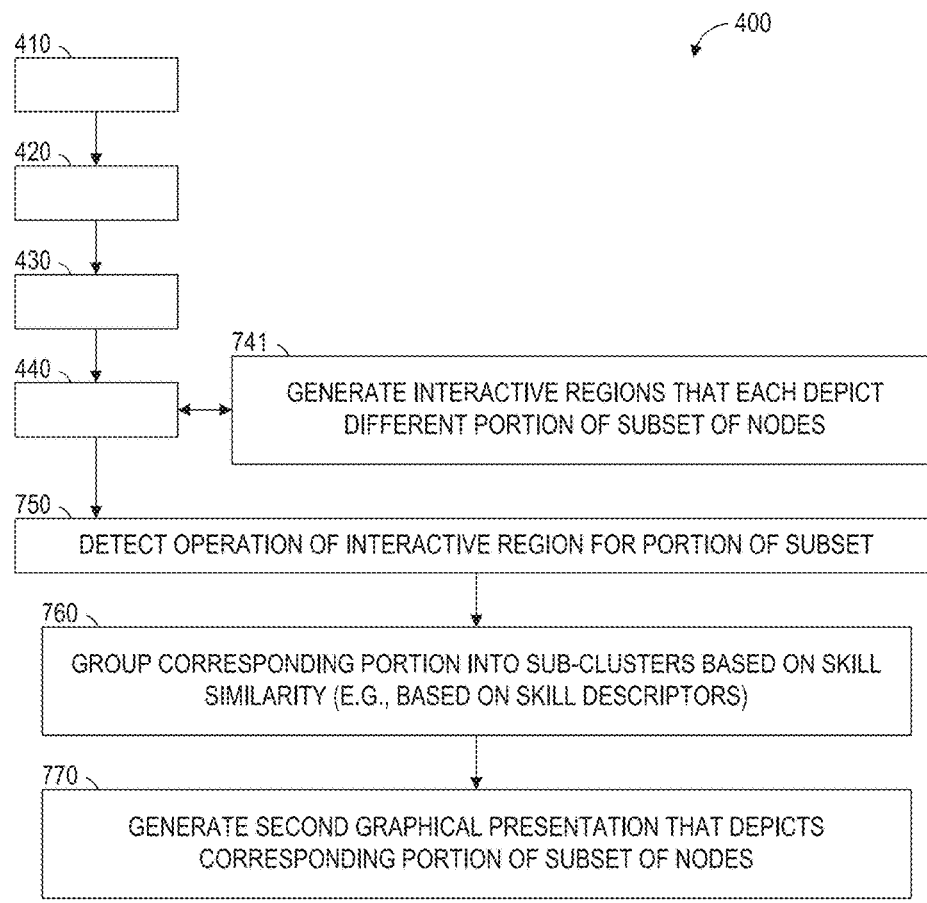

In some example embodiments, the graphical presentation (e.g., the influence map) generated in operation 440 is interactive and has interactive regions. Accordingly, as shown in FIG. 7, the method 400 may include one or more of operations 741, 750, 760, and 770, according to various example embodiments.

Operation 741 may be performed as part of operation 440, in which the map module 240 generates the graphical presentation of at least one grouped subset of nodes. In operation 741, the map module 240 generates one or more interactive regions of the graphical presentation. Each interactive region depicts a different portion of the presented one or more subsets of nodes. Moreover, each interactive region of the graphical presentation (e.g., first graphical presentation) is operable to request generation of another (e.g., second) graphical presentation that depicts its corresponding portion of the presented one or more subsets of nodes.

In example embodiments in which a single subset of nodes is depicted in the generated presentation, operation 741 results in the generation of multiple interactive regions that each depict a different portion of that single subset of nodes. However, in example embodiments in which multiple subsets of nodes are depicted in the generated presentation, operation 741 results in generation of multiple interactive regions that each depict a different portion of the multiple subsets. In some cases, the multiple interactive regions are aligned with the multiple subsets, such that each interactive region depicts a different subset. In other cases, the multiple interactive regions are not aligned with the multiple subsets, and a particular interactive region may include nodes from more than one subset.

One or more of operations 750, 760, and 770 may be performed after operation 440, in which the map module 240 generates the graphical presentation of one or more subsets of nodes. In operation 750, the map module 240 detects operation of an interactive region among the interactive regions generated in operation 741. For example, the map module 240 may detect that the interactive region has been operated (e.g., activated, chosen, or selected) by the user 132 via a touch input (e.g., a touch or tap upon the interactive region) received or otherwise detected by the device 130. Such a touch input may be processed by the device 130 and communicated to the map module 240 via the network 190.

In operation 760, the map module 240 responds to the detected operation of the interactive region by grouping its corresponding portion of the presented one or more subsets of nodes into sub-clusters. In other words, the map module 240 subdivides the portion by forming sub-clusters from the nodes included in the presented one or more subsets of nodes, in response to operation of the interactive region. Operation 760 may be performed based on (e.g., by or according to) degrees of similarity in skills (e.g., in a manner similar to that described above for operation 430). For example, operation 760 may be performed based on the collective (e.g., aggregated) skill descriptors (e.g., skill descriptors 314) included in the profiles of the nodes depicted within the interactive region. As noted above, clustering of such nodes may be performed by grouping their profiles (e.g., profile 313), grouping references (e.g., node identifiers or profile identifiers) that correspond to their profiles, or any suitable combination thereof.

In operation 770, the map module 240 continues responding to the detected operation of the interactive region of the graphical presentation (e.g., first graphical presentation) by generating another (e.g., second) graphical presentation that depicts the corresponding portion of the presented one or more subsets of nodes. Furthermore, one or more of the sub-clusters formed in operation 760 may be depicted in the (e.g., second) graphical presentation generated in operation 770.

Figure 8:
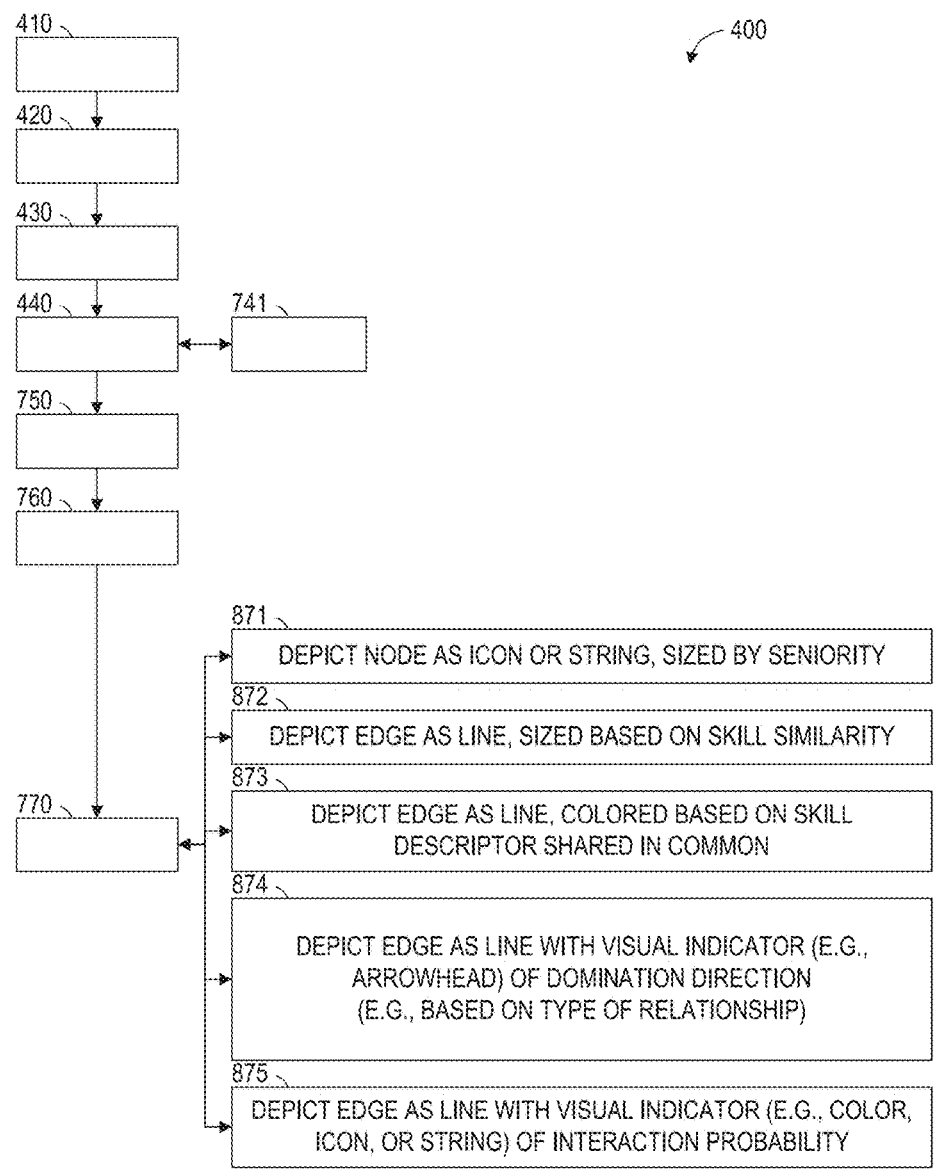

As shown in FIG. 8, according to various example embodiments, one or more of operations 871, 872, 873, 874, and 875 may be performed as part of operation 770, in which the map module 240 generates, for example, the second graphical presentation of nodes. Each of operations 871, 872, 873, 874, and 875 may respectively be performed in a manner analogous or otherwise similar to operations 541, 542, 543, 544, and 545.

In operation 871, as part of generating the second graphical presentation, the map module 240 depicts a node as an icon, a text string, or any suitable combination thereof. As noted above, the icon or text string may be generated with a size (e.g., in terms of pixel height, pixel width, or both) that indicates the seniority of the node (e.g., a level of the absolute seniority or relative seniority in comparison to other nodes depicted or to be depicted in the graphical presentation).

In operation 872, as part of generating the second graphical presentation, the map module 240 depicts a relationship (e.g., edge) between two nodes as a line (e.g., one or more line segments, curved or straight) whose thickness indicates similarity in skill between the two nodes. For example, the thickness of the line may be determined (e.g., chosen or selected) by the map module 240 based on a corresponding vector distance between the two nodes (e.g., as calculated in operation 531), where the vector distance represents a degree or extent to which the skill descriptors (e.g., skill descriptors 314) in one node's profile (e.g., profile 313) are similar to the skill descriptors in the other node's profile.

In operation 873, as part of generating the second graphical presentation, the map module 240 depicts a relationship (e.g., an edge) between two nodes as a line whose color indicates similarity in skill between the two nodes. For example, the color of the line may be determined by the map module 240 based on a corresponding vector distance between the two nodes (e.g., as calculated in operation 531). As noted above, such a vector distance may be calculated based on the skill descriptors of the corresponding pair of nodes. For example, the color of the line may be determined by a quantity (e.g., 0, 1, 2, 5, 10, or 50) of skill descriptors (e.g., one or more of the skill descriptors 314) that are shared in common by the profiles (e.g., profiles 313 and 316) of the corresponding pair of nodes.

In operation 874, as part of generating the second graphical presentation, the map module 240 depicts a relationship (e.g., an edge) between two nodes as a line with (e.g., adjacent to, proximate to, or otherwise visually accompanied by) a visual indicator (e.g., a third, fourth, or fifth visual indicator) that indicates a direction of domination between the two nodes. As noted above, the visual indicator may be or include an arrowhead or other directional symbol. In performing operation 874, the map module 240 may determine the direction of domination based on one or more types of relationship between the two nodes (e.g., indicated in the corresponding profiles for the two nodes). Examples of such relationship types include a supervisory relationship (e.g., manager to employee), a seniority relationship (e.g., mentor to mentee, or veteran to new hire), a parental relationship (e.g., parent to child), an instructional relationship (e.g., teacher to student), or any suitable combination thereof.

In operation 875, as part of generating the second graphical presentation, the map module 240 depicts a relationship (e.g., an edge) between two nodes as a line with a visual indicator (e.g., a third, fourth, fifth, or sixth visual indicator) that indicates a probability of interaction between entities represented by the two nodes. For example, the visual indicator may be or include a color of the line, an icon (e.g., presented with the line), text string (e.g., presented with the line), or any suitable combination thereof. The visual indicator may be determined (e.g., chosen or selected) by the map module 240 based on a corresponding vector distance between the two nodes (e.g., as calculated operation 531), as well as one or more additional analytical operations.

FIGS. 9-11 are color screenshots depicting generated influence maps, according to some example embodiments. As shown in FIG. 9, nodes depicted in the influence map are centered about a text string (e.g., "Milad AlemZadeh") that represents a node for a user (e.g., user 132) who is a member of the online social networking service. At least seven interactive regions (e.g., zones) of the example influence map shown in FIG. 9 are each colored differently, namely, medium blue, medium orange, medium green, light blue, dark purple, light orange, and light purple. In some example embodiments, any one or more of these interactive regions are operable (e.g., clickable) to request generation of another (e.g., second or further) graphical presentation that depicts the nodes contained within the operated interactive region (e.g., as described above with respect to FIG. 7). Relationships (e.g., edges) between any two nodes are represented by curved lines.

As shown in FIG. 10, an influence map may be centered about a text string (e.g., "LinkedIn") that represents a node for an entity that is a company (e.g., LinkedIn Corporation). Similar FIG. 9, the influence map shown in FIG. 10 may the generated to contain interactive regions. In the example influence map shown in FIG. 10, each interactive region is colored differently, specifically, colored medium blue, medium orange, medium green, light blue, dark purple, light orange, and light purple. As noted above, any such interactive region may be operable to request generation of a subsequent graphical presentation that depicts nodes of the operated interactive region.

As shown in FIG. 11, an influence map may depict subsets (e.g., clusters or groups) of nodes with different colors for each subset (e.g., dark blue, dark green, medium green, dark yellow, medium teal, and medium purple). In addition, relationships between any two nodes may be represented by lines (e.g., curved lines) whose thicknesses are indicative of skill similarity (e.g., degrees or extents to which skill descriptors are similar) between the two nodes, likelihood of interaction between entities represented by the two nodes, or any suitable combination thereof. As shown in FIG. 11, some or all of the lines that represent relationships between nodes may themselves be colored. For example, the color of a dominant node may be used as the color of the line that connects the dominant node to a subordinate node, such that the color of the line forms all or part of a visual indicator that indicates a direction of dominance in the relationship (e.g., influence relationship) between the two nodes.

According to various example embodiments, one or more of the methodologies described herein may facilitate determination (e.g., prediction or inference) of various influence relationships among a group of entities (e.g., members of an online social networking service). Moreover, one or more of the methodologies described herein may facilitate generation of one or more influence maps that depict some or all of these influence relationships.

When these effects are considered in aggregate, one or more of the methodologies described herein may obviate a need for certain efforts or resources that otherwise would be involved in analyzing, inferring, predicting, or otherwise determining such influence relationships within groups of entities. Efforts expended by a user in determining such influence relationships and generating a graphical depictions thereof may be reduced by use of (e.g., reliance upon) a machine that implements one or more of the methodologies described herein. In comparison to machines of similar purpose, a machine that implements one or more the methodologies described herein is an improvement to the relevant technology and technical field. Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 12:
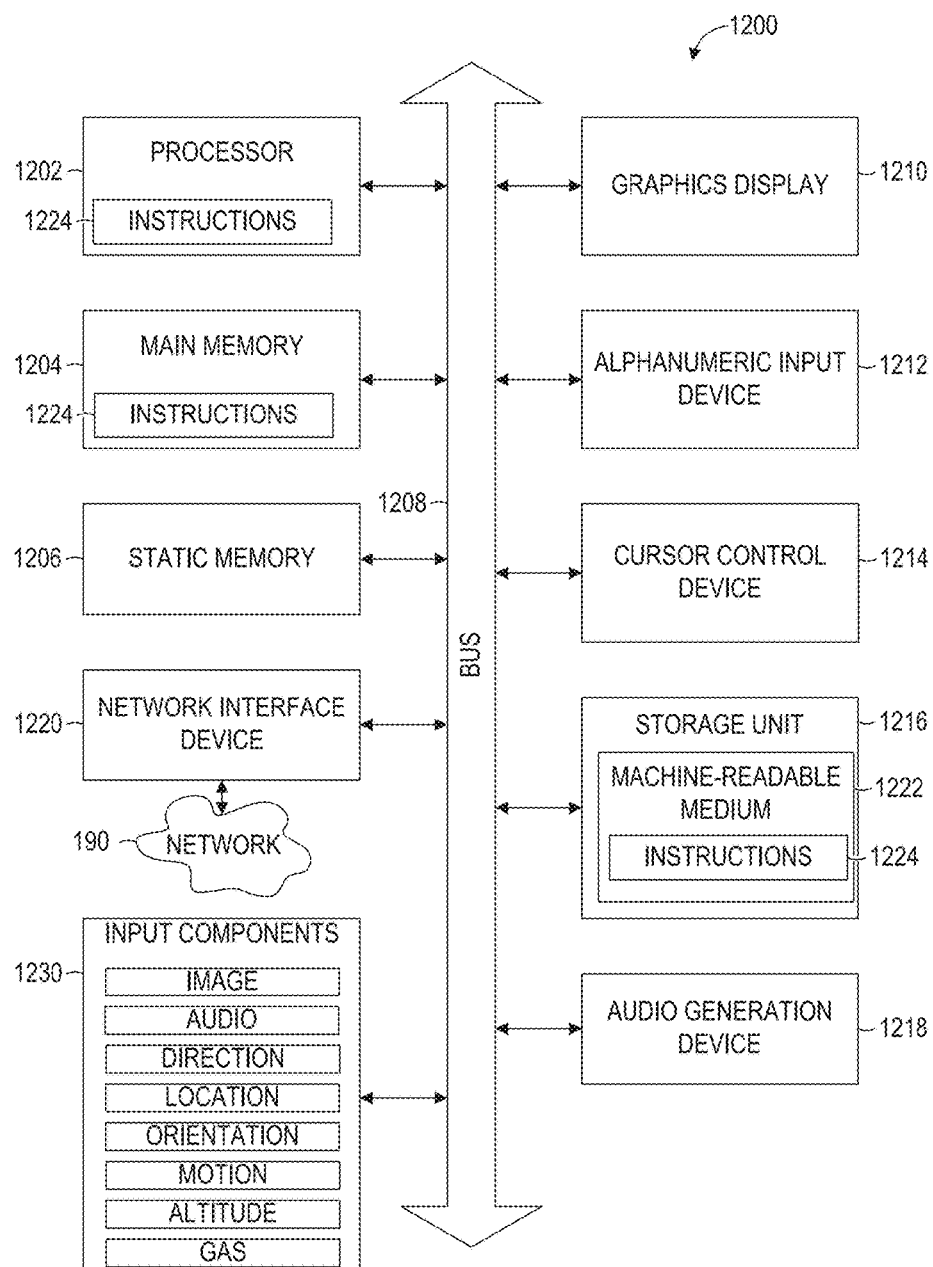
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1200 with at least the processor 1202, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1224 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1224).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., apparatus) discussed herein.

A first embodiment provides a method comprising:
by a profile module comprising one or more processors, accessing a database of profiles that describe nodes of a social graph, each profile among the profiles corresponding to a different node among the nodes of the social graph, each profile including skill descriptors of its corresponding node and experience data of its corresponding node;
by a rank module comprising one or more processors, ranking the nodes of the social graph by seniority based on the experience data included in the profiles that describe the nodes of the social graph;
by a skill module comprising one or more processors, grouping the nodes of the social graph into clusters by degrees of similarity in skills based on the skill descriptors included in the profiles that describe the nodes of the social graph; and
by a map module comprising one or more processors, generating a graphical presentation of a subset of the nodes of the social graph, the graphical presentation displaying the subset of the nodes with first visual indicators of seniority and second visual indicators of degrees of similarity in skills.

A second embodiment provides a method according to the first embodiment, wherein:
the grouping of the nodes of the social graph into clusters includes, for each pair of nodes in the social graph, calculating a vector distance that represents similarity in skill between the corresponding pair of nodes based on skill descriptors of the corresponding pair of nodes.

A third embodiment provides a method according to the first embodiment or the second embodiment, wherein:
the grouping of the nodes of the social graph into clusters is based on a maximum number of clusters to be included in the graphical representation.

A fourth embodiment provides a method according to any of the first through third embodiments, wherein:
the generating of the graphical presentation includes determining the subset to be depicted in the graphical presentation, the determining being based on a maximum number of nodes to be included in any presented subset in the graphical presentation.

A fifth embodiment provides a method according to any of the first through fourth embodiments, wherein:
the generated graphical presentation depicts a node among the subset of the nodes as at least one of an icon or a text string, the icon or the text string having a size that indicates seniority of the node.

A sixth embodiment provides a method according to any of the first through fifth embodiments, wherein:
the generated graphical presentation depicts an edge between two nodes among the subset of the nodes as a line whose thickness indicates a degree of similarity in skills corresponding to the two nodes.

A seventh embodiment provides a method according to any of the first through sixth embodiments, wherein:
the generated graphical presentation depicts an edge between two nodes among the subset of the nodes as a line whose color is determined by skill descriptors shared in common by profiles of the two nodes.

An eighth embodiment provides a method according to any of the first through seventh embodiments, wherein:
the generated graphical presentation depicts an edge between two nodes among the subset of the nodes as a line with a third visual indicator that indicates a direction of domination between the two nodes.

A ninth embodiment provides a method according to the eighth embodiment, wherein:
the third visual indicator that indicates the direction of domination includes an arrowhead that represents at least one of a supervisory relationship, a seniority relationship, a parental relationship, or an instructional relationship, between the two nodes.

A tenth embodiment provides a method according to any of the first through ninth embodiments, wherein:
the generated graphical representation depicts an edge between two nodes among the subset of the nodes as a line with a further (e.g., third or fourth) visual indicator that indicates a probability of interaction between entities represented by the two nodes.

An eleventh embodiment provides a method according to any of the first through tenth embodiments, wherein:
the social graph is a first social graph that forms a portion of a second social graph; and method further comprises
selecting the nodes of the first social graph from nodes in the second social graph based on a criterion shared in common among the profiles that describe the nodes of the first social graph, the shared criterion being included in each of the profiles that describe the nodes of the first social graph.

A twelfth embodiment provides a method according to the eleventh embodiment, wherein:
the criterion shared in common among the profiles is at least one of: a company name, a department name, or a geographical region.

A thirteenth embodiment provides a method according to any of the first through twelfth embodiments, further comprising:
detecting that the criterion was submitted by a user represented by a node among the nodes of the social graph; and wherein
the generated graphical representation depicts the subset of the nodes centered about the node that represents the user who submitted the criterion.

A fourteenth embodiment provides a method according to any of the first through thirteenth embodiments, wherein:
the generated graphical presentation is a first graphical presentation that includes interactive regions, each interactive region depicting a different portion of the subset of the nodes of the social graph, an interactive region among the interactive regions being operable to request generation of a second graphical presentation that depicts its corresponding portion of the subset of the nodes; and
the method further comprises:
responding to operation of the interactive region by grouping its corresponding portion of the subset of the nodes into sub-clusters by degrees of similarity in skills; and
generating the second graphical presentation.

A fifteenth embodiment provides a method according to the fourteenth embodiment, wherein:
the generated second graphical presentation of the portion of the subset of the nodes displays an edge between two nodes in the portion of the subset of the nodes as a line whose color is determined by skill descriptors shared in common by profiles of the two nodes.

A sixteenth embodiment provides a method according to any of the first through fifteenth embodiments, wherein:
the nodes of the social graph represent at least one of: members of an online social networking service, employees of a company, or available jobs.

A seventeenth embodiment provides a machine-readable medium (e.g., a non-transitory machine-readable storage medium) comprising instructions that, when executed by one or more processors of a machine, cause the machine to perform operations comprising:
by a profile module comprising one or more of the processors, accessing a database of profiles that describe nodes of a social graph, each profile among the profiles corresponding to a different node among the nodes of the social graph, each profile including skill descriptors of its corresponding node and experience data of its corresponding node;
by a rank module comprising one or more of the processors, ranking the nodes of the social graph by seniority based on the experience data included in the profiles that describe the nodes of the social graph;
by a skill module comprising one or more of the processors, grouping the nodes of the social graph into clusters by degrees of similarity in skills based on the skill descriptors included in the profiles that describe the nodes of the social graph; and
by a map module comprising one or more of the processors, generating a graphical presentation of a subset of the nodes of the social graph, the graphical presentation displaying the subset of the nodes with first visual indicators of seniority and second visual indicators of degrees of similarity in skills.

An eighteenth embodiment provides a machine-readable medium according to the seventeenth embodiment, wherein:
the generated graphical presentation depicts a node among the subset of the nodes as at least one of an icon or a text string, the icon or the text string having a size that indicates seniority of the node.

A nineteenth embodiment provides a system comprising:
a profile module comprising one or more hardware processors and configured to access a database of profiles that describe nodes of a social graph, each profile among the profiles corresponding to a different node among the nodes of the social graph, each profile including skill descriptors of its corresponding node and experience data of its corresponding node;
a rank module comprising one or more hardware processors and configured to rank the nodes of the social graph by seniority based on the experience data included in the profiles that describe the nodes of the social graph;
a skill module comprising one or more hardware processors and configured to group the nodes of the social graph into clusters by degrees of similarity in skills based on the skill descriptors included in the profiles that describe the nodes of the social graph; and
a map module comprising one or more hardware processors and configured to generate a graphical presentation of a subset of the nodes of the social graph, the graphical presentation displaying the subset of the nodes with first visual indicators of seniority and second visual indicators of degrees of similarity in skills.

A twentieth embodiment provides a system according to the nineteenth embodiment, wherein:
the generated graphical presentation depicts an edge between two nodes among the subset of the nodes as a line whose color is determined by skill descriptors shared in common by profiles of the two nodes.

A twenty first embodiment provides a carrier medium carrying machine-readable instructions for controlling a machine to carry out the method of any one of the previously described embodiments.

A twenty second embodiment provides a system comprising:
one or more processors (e.g., processor 1202);
a memory device (e.g., memory 1204) storing (e.g., holding) and instruction set (e.g., instructions 1224) executable on the processor to cause the system to perform operations according to the method of any one of the previously described embodiments.

What is claimed is:
1. A method comprising:
accessing, by one or more processors, a database of profiles that describe nodes of a social graph, the nodes of the social graph representing members of an online social networking service, each profile among the profiles corresponding to a different node among the nodes of the social graph, each profile including skill descriptors of its corresponding node, experience data of its corresponding node, and at least one skill endorsement of its node, the at least one skill endorsement comprising an indicator that at least one of the corresponding skill descriptors of its node has been endorsed by one or more members of the online social networking service;

ranking, by the one or more processors, the nodes of the social graph by seniority based on the experience data included in the profiles that describe the nodes of the social graph;

grouping, by the one or more processors, the nodes of the social graph into clusters by degrees of similarity in skills based on the skill descriptors included in the profiles that describe the nodes of the social graph and the at least one skill endorsement included in the profiles that describe the nodes of the social graph; and generating, by the one or more processors, a graphical presentation of a subset of the nodes of the social graph, the graphical presentation displaying the subset of the nodes as at least one of an icon or a text string, the icon or the text string having a size that indicates seniority of a member represented by a node, and an edge between two nodes among the subset of nodes as a line whose thickness indicates a degree of similarity in skills corresponding to members represented by the two nodes.

2. The method of claim 1, wherein:
the grouping of the nodes of the social graph into clusters includes, for each pair of nodes in the social graph, calculating a vector distance that represents similarity in skill between the corresponding pair of nodes based on skill descriptors of the corresponding pair of nodes.

3. The method of claim 1, wherein:
the grouping of the nodes of the social graph into clusters is based on a maximum number of clusters to be included in the graphical representation.

4. The method of claim 1, wherein:
the generating of the graphical presentation includes determining the subset to be depicted in the graphical presentation, the determining being based on a maximum number of nodes to be included in any presented subset in the graphical presentation.

5. The method of claim 1, wherein:
the generated graphical presentation depicts an edge between two nodes among the subset of the nodes as a line whose color is determined by skill descriptors shared in common by profiles of the two nodes.

6. The method of claim 1, wherein:
the generated graphical presentation depicts an edge between two nodes among the subset of the nodes as a line with a visual indicator that indicates a direction of domination between the two nodes.

7. The method of claim 6, wherein:
the visual indicator that indicates the direction of domination includes an arrowhead that represents at least one of a supervisory relationship, a seniority relationship, a parental relationship, or an instructional relationship, between the two nodes.

8. The method of claim 1, wherein:
the generated graphical representation depicts an edge between two nodes among the subset of the nodes as a line with a visual indicator that indicates a probability of interaction between entities represented by the two nodes.

9. The method of claim 1, wherein:
the social graph is a first social graph that forms a portion of a second social graph; and the method further comprises selecting the nodes of the first social graph from nodes in the second social graph based on a criterion shared in common among the profiles that describe the nodes of the first social graph, the shared criterion being included in each of the profiles that describe the nodes of the first social graph.

10. The method of claim 9, wherein:
the criterion shared in common among the profiles is at least one of:
a company name,
a department name, or
a geographical region.

11. The method of claim 9, further comprising:
detecting that the criterion was submitted by a user represented by a node among the nodes of the social graph; and
wherein the generated graphical representation depicts the subset of the nodes centered about the node that represents the user who submitted the criterion.

12. The method of claim 1, wherein:
the generated graphical presentation is a first graphical presentation that includes interactive regions, each interactive region depicting a different portion of the subset of the nodes of the social graph, an interactive region among the interactive regions being operable to request generation of a second graphical presentation that depicts its corresponding portion of the subset of the nodes; and
the method further comprises:
responding to operation of the interactive region by grouping its corresponding portion of the subset of the nodes into sub-clusters by degrees of similarity in skills; and
generating the second graphical presentation.

13. The method of claim 12, wherein:
the generated second graphical presentation of the portion of the subset of the nodes displays an edge between two nodes in the portion of the subset of the nodes as a line whose color is determined by skill descriptors shared in common by profiles of the two nodes.

14. A non-transitory machine-readable storage medium comprising instructions that, when executed by one or more processors of a machine, cause the machine to perform operations comprising:
accessing a database of profiles that describe nodes of a social graph, the nodes of the social graph representing members of an online social networking service, each profile among the profiles corresponding to a different node among the nodes of the social graph, each profile including skill descriptors of its corresponding node, experience data of its corresponding node, and at least one skill endorsement of its node, the at least one skill endorsement comprising an indicator that at least one of the corresponding skill descriptors of its node has been endorsed by one or more members of the online social networking service;
ranking the nodes of the social graph by seniority based on the experience data included in the profiles that describe the nodes of the social graph;
grouping the nodes of the social graph into clusters by degrees of similarity in skills based on the skill descriptors included in the profiles that describe the nodes of the social graph and the at least one skill endorsement included in the profiles that describe the nodes of the social graph; and generating a graphical presentation of a subset of the nodes of the social graph, the graphical presentation displaying the subset of the nodes as at least one of an icon or a text string, the icon or the text string having a size that indicates seniority of a member represented by a node, and an edge between two nodes among the subset of nodes as a line whose thickness indicates a degree of similarity in skills corresponding to members represented by the two nodes.

15. The non-transitory machine-readable storage medium of claim 14, wherein:

the generated graphical presentation depicts a node among the subset of the nodes as at least one of an icon or a text string, the icon or the text string having a size that indicates seniority of the node.

16. A system comprising:

a processor; and a memory device holding an instruction set executable on the processor to cause the system to perform operations comprising:

accessing a database of profiles that describe nodes of a social graph, each profile among the profiles corresponding to a different node among the nodes of the social graph, the nodes of the social graph representing members of an online social networking service, each profile including skill descriptors of its corresponding node, experience data of its corresponding node, and at least one skill endorsement of its node, the at least one skill endorsement comprising an indicator that at least one of the corresponding skill descriptors of its node has been endorsed by one or more third parties;

ranking the nodes of the social graph by seniority based on the experience data included in the profiles that describe the nodes of the social graph;

grouping the nodes of the social graph into clusters by degrees of similarity in skills based on the skill descriptors included in the profiles that describe the nodes of the social graph and the at least one skill endorsement included in the profiles that describe the nodes of the social graph; and generating a graphical presentation of a subset of the nodes of the social graph, the graphical presentation displaying the subset of the nodes as at least one of an icon or a text string the icon or the text string having a size that indicates seniority of a member represented by a node, and an edge between two nodes among the subset of nodes as a line whose thickness indicates a degree of similarity in skills corresponding to members represented by the two nodes.

17. The system of claim 16, wherein:

the generated graphical presentation depicts an edge between two nodes among the subset of the nodes as a line whose color is determined by skill descriptors shared in common by profiles of the two nodes.

* * * * *

UNITED STATES PATENT AND TRADEMARK OFFICE
CERTIFICATE OF CORRECTION

PATENT NO. : 10,262,082 B2  
APPLICATION NO. : 14/751862  
DATED : April 16, 2019  
INVENTOR(S) : Rodriguez et al.

It is certified that error appears in the above-identified patent and that said Letters Patent is hereby corrected as shown below:

On the Title Page

On page 2, in Column 2, item (56), under "Other Publications", Line 5, delete ""LinkedIn" and insert --"LinkedIn-- therefor In the Claims In Column 22, Line 4, in Claim 9, after "comprises", insert --:--

In Column 24, Line 18, in Claim 16, after "a text string", insert --,--

Signed and Sealed this  
Second Day of November, 2021

Drew Hirshfeld  
*Performing the Functions and Duties of the  
Under Secretary of Commerce for Intellectual Property and  
Director of the United States Patent and Trademark Office*